(12) United States Patent
Sawa et al.

(10) Patent No.: US 8,208,515 B2
(45) Date of Patent: Jun. 26, 2012

(54) ON-VEHICLE COMMUNICATION DEVICE

(75) Inventors: Yoshitsugu Sawa, Tokyo (JP); Hiroshi Araki, Tokyo (JP); Yukio Goto, Tokyo (JP); Masanobu Hiramine, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 881 days.

(21) Appl. No.: 12/205,962

(22) Filed: Sep. 8, 2008

(65) Prior Publication Data

US 2009/0082920 A1  Mar. 26, 2009

(30) Foreign Application Priority Data

Sep. 26, 2007  (JP) .................................. 2007-248529

(51) Int. Cl.
*H04B 1/00* (2006.01)
(52) U.S. Cl. ........................................................ 375/150
(58) Field of Classification Search .................. 375/130, 375/147, 149, 150, 152; 701/36
See application file for complete search history.

(56) References Cited

U.S. PATENT DOCUMENTS

| | | | | |
|---|---|---|---|---|
| 5,862,172 | A | * | 1/1999 | Sugita et al. ................... 375/142 |
| 2006/0025136 | A1 | * | 2/2006 | Fujita et al. .................... 455/436 |
| 2006/0063489 | A1 | | 3/2006 | Akaike et al. |

FOREIGN PATENT DOCUMENTS

| | | |
|---|---|---|
| JP | 3-195227 | 8/1991 |
| JP | 5-106376 | 4/1993 |
| JP | 8-256085 | 10/1996 |
| JP | 8-256086 | 10/1996 |
| JP | 9-223989 | 8/1997 |
| JP | 10-22872 | 1/1998 |
| JP | 2003-500957 | 1/2003 |
| JP | 2003-188767 | 7/2003 |
| JP | 2008-92267 | 4/2008 |

OTHER PUBLICATIONS

Japanese Office Action issued Oct. 3, 2011, in Patent Application No. 2007-248529 (with Partial English-langauge translation).
Office Action issued Feb. 27, 2012 in German Application No. 10 2008 048 750.3 with English translation, pp. 16.

* cited by examiner

*Primary Examiner* — Sam K Ahn
(74) *Attorney, Agent, or Firm* — Oblon, Spivak, McClelland, Maier & Neustadt, L.L.P.

(57) ABSTRACT

An on-vehicle communication device according to the present invention includes initial signal estimating unit 243b for estimating initial data based on a part of the transmission command signal from the mobile device. Thus, it also includes PN signal generating unit 243c for generating a PN signal based on the initial data estimated by the initial signal estimating unit, and partial correlating unit 243d for calculating a correlation value between the transmission command signal from the mobile device and the PN signal. Thus, it also includes a data demodulating unit 244 for demodulating the transmission command signal from the mobile device, the starting of the data demodulating unit being controlled based on the correlation value calculated by the partial correlating unit 243d.

11 Claims, 9 Drawing Sheets

FIG. 5

| TRANSMISSION COMMAND SIGNAL | INITIAL DATA 1 | INITIAL DATA 2 |
|---|---|---|
| 00000001 | 11100 | 11101 |
| 00000010 | 11001 | 11011 |
| 00000101 | 10011 | 10110 |
| 00000111 | 01110 | 01001 |
| 00001010 | 00110 | 01100 |
| 00001111 | 11101 | 10010 |
| 00010000 | 01010 | 11010 |
| 00010100 | 01101 | 11001 |
| 00011111 | 11011 | 00100 |
| 00100000 | 10101 | 10101 |
| 00101001 | 11010 | 10011 |
| 00111000 | 01000 | 10000 |
| 00111110 | 10110 | 01000 |
| 01000000 | 11111 | 11111 |
| 01000001 | 01011 | 01010 |
| 01001110 | 10010 | 11100 |
| 01010011 | 10100 | 00111 |
| 01110001 | 10000 | 00001 |
| 01111101 | 01100 | 10001 |
| 10000000 | 11110 | 11110 |
| 10000011 | 10111 | 10100 |
| 10001000 | 00101 | 01101 |
| 10011100 | 00100 | 11000 |
| 10100000 | 01111 | 01111 |
| 10100111 | 01001 | 01110 |
| 11000100 | 00010 | 00110 |
| 11010000 | 00111 | 10111 |
| 11100010 | 00001 | 00011 |
| 11110100 | 10001 | 00101 |
| 11111010 | 11000 | 00010 |

ON-VEHICLE COMMUNICATION DEVICE

BACKGROUND OF THE INVENTION

1. Field of the Invention

The present invention relates to an on-vehicle communication device performing a code matching operation through a communication with a mobile device and controlling an on-vehicle equipment based on its matching result.

2. Description of the Background Art

An on-vehicle communication device mounted on a vehicle communicates with a mobile device through a modulated signal modulated by spread spectrum. Such on-vehicle communication device conventionally includes a smart entry function in addition to a remote operation function. According to the remote operation function, when an operation part of the mobile device is operated by a user, for example, a modulated transmission command signal is transmitted from the mobile device, and the on-vehicle device controls an on-vehicle equipment to lock/unlock a vehicle door, for example in response to the transmission command signal. According to the smart entry function, the mobile device automatically returns a response signal including a return code signal in response to a question signal transmitted from the on-vehicle device. Thus, the on-vehicle device performs a matching operation with the return code signal from the mobile device and locks/unlocks the door based on its matching result. According to the smart entry function performing the above operation, the door can be locked/unlocked without operating the operation part of the mobile device.

Remote control system of an on-vehicle equipment disclosed in Japanese Patent Application Laid-Open No. 5-106376 includes a mobile radio device and a vehicle radio device. According to this system, the mobile radio device has first receiving means and first transmitting means for transmitting a response signal when the first receiving means receives a call signal. Meanwhile, the vehicle radio device has second transmitting means for transmitting the call signal at predetermined time intervals, and second receiving means for receiving the response signal from the mobile radio device. Thus, the vehicle radio device has controlling means for outputting a signal for unlocking a vehicle door when the second receiving means receives the response signal and outputting a signal for locking the vehicle door after a lapse of predetermined time when the second receiving means does not receive the response signal.

Japanese Published Patent Publication No. 2003-500957 discloses a multiple-access spread spectrum communication system that evens out response times of a plurality of mobile devices for a question request signal from a vehicle, regardless of the number of mobile devices.

In addition, according to a vehicle communication device disclosed in Japanese Patent Application laid-Open No. 2003-188767, in order to speed up system synchronization of spread spectrum, a synchronous processing is performed using a plurality of partial correlating units to calculate a correlation value. Thus, when the calculated correlation value is smaller than a predetermined threshold value in a comparison operating unit for comparing the result of each partial correlating device, clock supply is stopped to prevent power consumption from being increased.

According to a conventional on-vehicle communication device, a transmission command signal is received from a mobile device and it is confirmed whether the transmission command signal is received or not periodically at the time of remote operation function. In order to confirm that, it is necessary to synchronize the transmission command signal with a PN signal, and when it takes time for the synchronization, the problem is that power consumption is increased. In order to solve this, as described above, the invention is proposed such that the synchronization time is shortened by speeding up the synchronization with the plurality of partial correlating units, and the partial correlating unit determined to be unnecessary is stopped to lower the power consumption. However, since the plurality of partial correlating units is used, the size of a circuit performing a clock operation is increased, and as a result the problem is that the power consumption is also increased.

SUMMARY OF THE INVENTION

It is an object of the present invention to prevent power consumption from being increased by shortening a time for synchronizing a transmission command signal with a PN signal without increasing a size of a circuit performing a clock operation.

An on-vehicle communication device according to the present invention communicates with a mobile device through a modulated signal modulated by spread spectrum and includes initial signal estimating means, reference signal generating means, partial correlating means and a data demodulating unit. The initial signal estimating means estimates initial data based on a part of the modulated signal from the mobile device. The reference signal generating means generates a reference signal based on the initial data estimated by the initial signal estimating means. The partial correlating means calculates a correlation value between the modulated signal from the mobile device and the reference signal. The data demodulating unit demodulates the modulated signal from the mobile device, the starting of the data demodulating unit being controlled based on the correlation value calculated by the partial correlating means.

Since a time for synchronizing the modulated signal with the reference signal can be shortened without increasing the size of the circuit performing the clock operation, the power consumption can be reduced.

These and other objects, featured, aspects and advantages of the present invention will become more apparent from the following detailed description of the present invention when taken in conjunction with the accompanying drawings.

BRIEF DESCRIPTION OF THE DRAWINGS

FIG. 5 is a view showing a conversion table provided in the on-vehicle device according to the first embodiment;

DESCRIPTION OF THE PREFERRED EMBODIMENTS

<First Embodiment>

Figure 1:
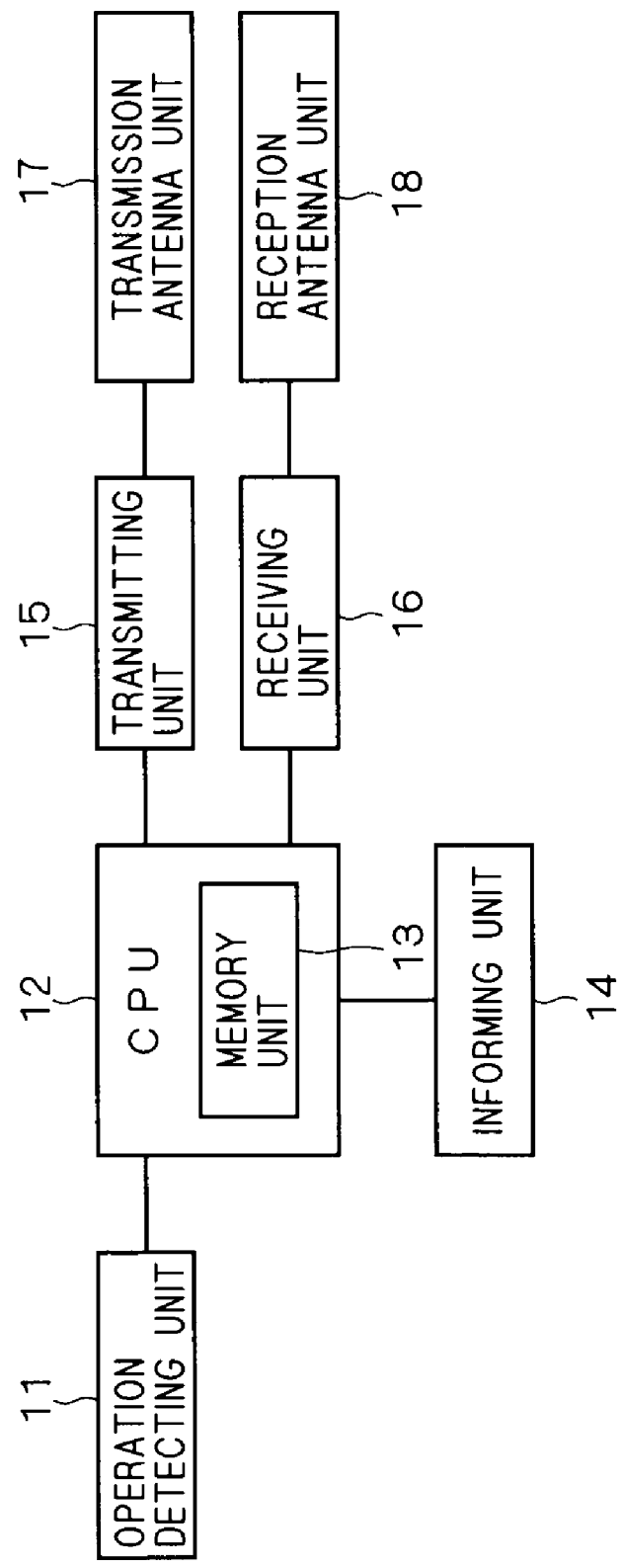
FIG. 1 is a block diagram showing a constitution of a mobile device communicating with an on-vehicle device according to a first embodiment.
Figure 2:
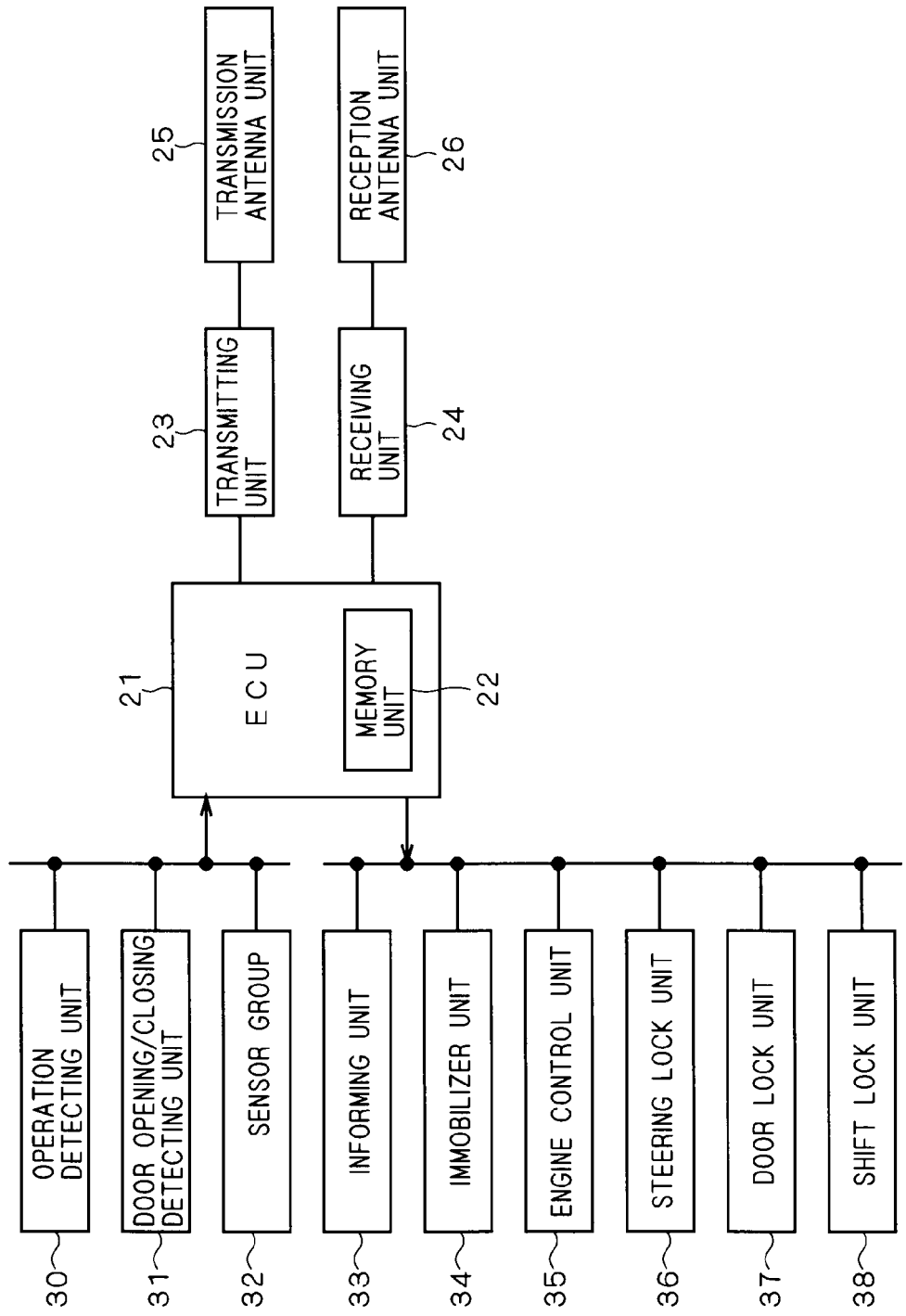
FIGS. 2 to 4 are block diagrams showing constitutions of the on-vehicle device according to the first embodiment.

An on-vehicle communication device according to the present invention is an on-vehicle device in this embodiment. FIG. 1 is a block diagram showing a constitution of a mobile device 10 according to this embodiment, and FIG. 2 is a block diagram showing a constitution of an on-vehicle device 20 according to this embodiment. The on-vehicle device 20 according to this embodiment communicates with the mobile device 10 through a modulated signal modulated by spread spectrum, and controls an on-vehicle equipment based on the communication. The modulated signal corresponds to a response signal used at the time of smart entry function, and a transmission command signal used at the time of remote operation function. First, the constitution of the mobile device 10 will be described and then the constitution of the on-vehicle device 20 will be described.

As shown in FIG. 1, the mobile device 10 according to this embodiment includes an operation detecting unit 11, a CPU (Central Processing Unit) 12, a memory unit 13, an informing unit 14, a transmitting unit 15, a receiving unit 16, a transmission antenna unit 17, and a reception antenna unit 18.

The CPU 12 incorporates the memory unit 13 in which an ID code, a cipher key or the like are stored. The memory unit 13 corresponds to a nonvolatile memory in which stored contents are retained even after a power supply is turned off which corresponds to an EEPROM (Electronically Erasable and Programmable Read Only Memory), for example.

As shown in FIG. 1, the transmission antenna unit 17 and the reception antenna unit 18 are connected to the transmitting unit 15 and the receiving unit 16, respectively, and the transmitting unit 15 and the receiving unit 16 are connected to the CPU 12. The reception antenna unit 18 receives a question signal transmitted from the on-vehicle device 20. The question signal is transmitted from the on-vehicle device 20 at a frequency of 125 kHz, for example. The receiving unit 16 demodulates the question signal received from the reception antenna unit 18 and supplies it to the CPU 12. The CPU 12 transmits transmission signal information to the transmitting unit 15 when the question signal is supplied from the receiving unit 16 or when the operation detecting unit 11 receives an operation from the outside.

Figure 3:
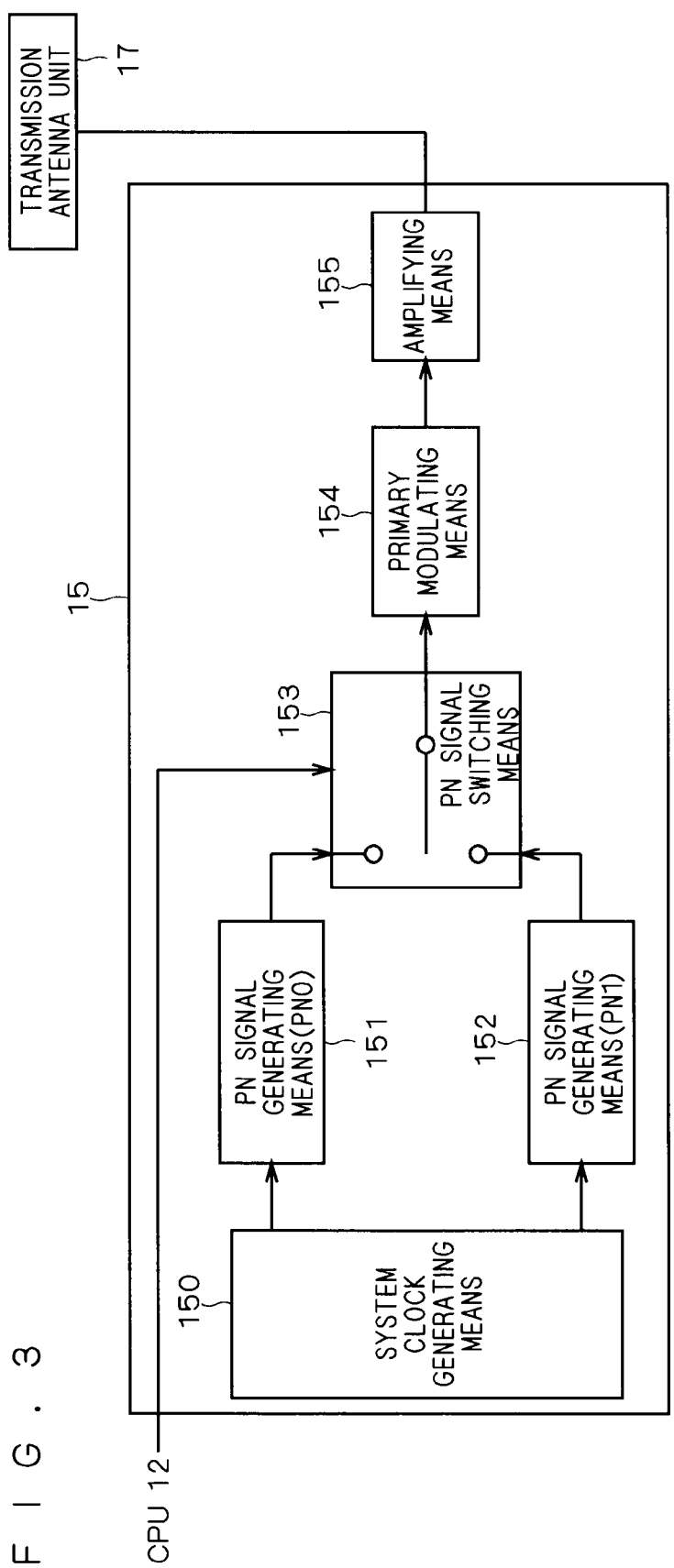

FIG. 3 is a block diagram showing a constitution of the transmitting unit 15 provided in the mobile device 10. As shown in FIG. 3, the transmitting unit 15 provided in the mobile device 10 according to this embodiment includes system clock generating means 150, PN signal generating means 151 and 152, PN signal switching means 153, primary modulating means 154 and amplifying means 155.

In the transmitting unit 15, a system clock is generated in the system clock generating means 150 and the generated system clock is supplied to the PN signal generating means 151 and 152. The PN signal generating means 151 and 152 generate PN signals serving as random signals for spread spectrum in response to the system clock, and transmit the generated PN signals to the PN signal switching means 153. The PN signal switching means 153 switches the PN signal generating means 151 and 152 based on transmission signal information transmitted from the CPU 12 and outputs it. Thus, the signal modulated by the spread spectrum is generated.

The primary modulating means 154 modulates the modulated signal generated by the PN signal switching means 153 at a transmission frequency of 315 MHz band, for example and transmits the modulated signal to the amplifying means 155. The amplifying means 155 amplifies the modulated signal and transmits it to the on-vehicle device 20 through the transmission antenna unit 17. The modulated signal in this embodiment corresponds to the response signal used at the time of smart entry function, and the transmission command signal used at the time of remote operation function.

Next, the constitution of the on-vehicle device 20 according to this embodiment will be described. As shown in FIG. 2, the on-vehicle device 20 according to this embodiment includes an ECU (electronic control unit) 21, a memory unit 22, a transmitting unit 23, a receiving unit 24, a transmission antenna unit 25, a reception antenna unit 26, an operation detecting unit 30, a door opening/closing detecting unit 31, a sensor group 32, an informing unit 33, an immobilizer unit 34, an engine control unit 35, a steering lock unit 36, a door lock unit 37, and a shift lock unit 38.

According to this embodiment, each of the transmission antenna unit 25 and the reception antenna unit 26 is made up with a plurality of antennas that are mounted on the vehicle as an interior antenna and an exterior antenna. The transmission antenna unit 25 is connected to the transmitting unit 23, and the transmitting unit 23 is connected to the ECU 21. The reception antenna unit 26 is connected to the receiving unit 24, and the receiving unit 24 is connected to the ECU 21. The reception antenna unit 26 receives the modulated signal transmitted from the mobile device 10. The receiving unit 24 demodulates the modulated signal received by the reception antenna unit 26 and supplies it to the ECU 21.

The ECU 21 incorporates the memory unit 22 in which ID codes for the question signal and for the immobilizer and cipher keys for the immobilizer and for decoding an answer code are stored. The memory unit 22 corresponds to a nonvolatile memory in which stored contents are retained even after the power supply is turned off, which corresponds to the EEPROM, for example.

The operation detecting unit 30 detects an external operation at the various kinds of switches, the operation of the user, for example, and it transmits a detection signal to the ECU 21 in response to the detection. The various kinds of switches include a start switch, an engine switch and a key knob switch. The start switch is provided in each outer door handle, and it is used as a switch for starting the transmission of the question signal in this embodiment. The engine switch is used for starting an engine, turning on an ignition, and turning on and off accessory, and controlling a lock. The key knob switch is used for starting the communication for unlocking when the engine switch is pressed.

The door opening/closing detecting unit 31 detects the opening/closing of each door, and locked/unlocked state of each door, and supplies its detection signal to the ECU 21. The sensor group 32 is composed of various kinds of sensors for detecting a car speed, a gear position and an engine operation condition, and a detection signal of each sensor is supplied to the ECU 21.

The ECU 21 is connected to the on-vehicle equipments. According to this embodiment, the on-vehicle equipments include the informing unit 33, the immobilizer unit 34, the engine control unit 35, the steering lock unit 36, the door lock unit 37, and the shift lock unit 38. Next, the on-vehicle equipments according to this embodiment will be described.

The informing unit 33 includes an answer-back device for flashing a light and blowing a horn of the vehicle as a so-called answer back at the time of door locking/on locking, an alarm device for sounding a buzzer for various kinds of alarms and a display device for displaying condition.

The immobilizer unit 34 is a mechanism for lifting the ban of fuel supply to the engine and an ignition operation. According to this embodiment, the ECU 21 controls the lifting of the ban of the immobilizer unit 34 with the ID code and the cipher key for the immobilizer stored in the memory unit 22, based on an authentication result with the mobile device 10 through the transmitting unit 23 and the receiving unit 24.

The engine control unit 35 is a mechanism for controlling the start of the engine by a cell motor and also controlling the stop of the engine. The steering lock unit 36 is a mechanism for locking and unlocking a steering with the engine switch. The door lock unit 37 is a mechanism for locking and unlocking all of the doors. The shift lock unit 38 is a lock device for banning the transition from a parking range to another range in a gear shift mechanism based on the permission/ban of the unlocking outputted from the ECU 21.

When the ECU 21 performs the operation of the smart entry function, the ECU 21 obtains the question signal from the memory unit 22 in response to the detection signal from the operation detecting unit 30 and transmits the question signal from the transmitting unit 23 to the mobile device 10 at a frequency of 125 KHz, for example. At the same time, the ECU 21 controls the receiving unit 24 to receive the response signal from the mobile device 10. Meanwhile, when the ECU 21 performs the operation of the remote operation function, the ECU 21 starts the receiving unit 24 periodically, so that the receiving unit 24 demodulates the transmission command signal from the mobile device 10. Thus, the on-vehicle device 20 according to this embodiment controls the above on-vehicle equipments based on the response signal and the transmission command signal from the mobile device 10.

According to the smart entry function, when the ECU 21 receives the detection signal from the operation detecting unit 30, the ECU 21 transmits the question signal from the transmitting unit 23 to the mobile device 10 in order to confirm whether the user carries the mobile device 10 or not. At the same time, the ECU 21 controls the receiving unit 24 to demodulate the response signal from the mobile device 10. Thus, basically, it is assumed that the response signal for the question signal is transmitted from the mobile device 10.

Meanwhile, according to the remote operation function, the ECU 21 starts the receiving unit 24 periodically in order to confirm whether the transmission command signal is transmitted from the mobile device 10 or not. When it is confirmed whether the transmission command signal is transmitted or not, it is necessary to synchronize the transmission command signal with a PN signal generated by the receiving unit 24, which will be described below. When the synchronization can be performed at high speed to shorten the time for confirming whether the transmission command signal is received or not, power consumption can be reduced.

Thus, a description will be made of the case where the remote operation function is carried out assuming that the modulated signal from the mobile device 10 is the transmission command signal in this embodiment hereinafter. However, the present invention is not limited to this and it may be assumed that the modulated signal from the mobile device 10 is the response signal to be applied to the smart entry function.

Figure 4:
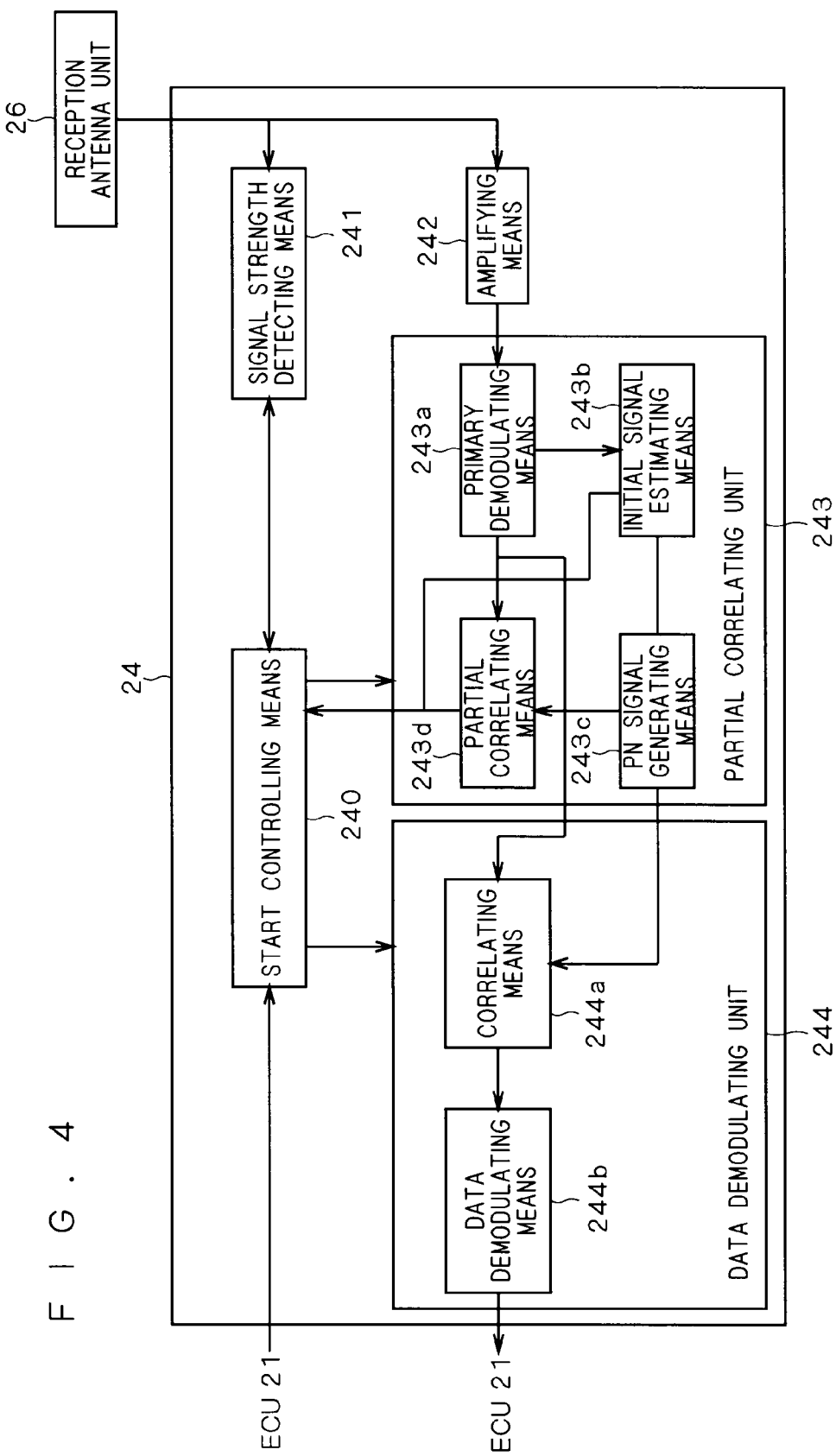

FIG. 4 is a block diagram showing a constitution of the receiving unit 24 provided in the on-vehicle device 20. The receiving unit 24 in the on-vehicle device 20 according to this embodiment includes start controlling means 240, signal strength detecting means 241, amplifying means 242, a partial correlating unit 243 and a data demodulating unit 244.

The receiving unit 24 is started when the start signal is outputted from the ECU 21 to the start controlling means 240. In addition, when the operation of the receiving unit 24 is changed based on the smart entry function or the remote operation function, a start signal by which the start controlling means 240 can determine whether the start is based on the smart entry function or the remote operation function is to be outputted from the ECU 21.

The start signal from the ECU 21 is inputted to the start controlling means 240. The start controlling means 240 starts the signal strength detecting means 241 in response to the start signal. The signal strength detecting means 241 monitors the strength of the transmission command signal, RSSI, for example from the reception antenna unit 26, and determines whether it is beyond a predetermined threshold value or not, and notifies the start controlling means 240 of its determination result. The start controlling means 240 starts the partial correlating unit 243 based on the determination result of the signal strength detecting means 241. In addition, the start controlling means 240 may control the supply of the system clock or may control the supply of the power source as the control of the start of the partial correlating unit 243.

When the signal strength detecting means 241 determines that the strength of the transmission command signal is beyond the predetermined threshold value, the amplifying means 242 amplifies the transmission command signal received by the reception antenna unit 26 and outputs the amplified transmission command signal to the partial correlating unit 243. According to this embodiment, the partial correlating unit 243 includes primary demodulating means 243*a*, initial signal estimating means 243*b*, PN signal generating means 243*c*, and partial correlating means 243*d*.

The primary demodulating means 243*a* demodulates the transmission command signal amplified by the amplifying means 242 from an analog signal to a digital signal. According to this embodiment, the primary demodulating means 243*a* demodulates the transmission command signal from the amplifying means 242 to the same signal as the signal before it is modulated by the primary modulating means 154 shown in FIG. 3. Thus, the primary demodulating means 243*a* outputs the demodulated signal to the initial signal estimating means 243*b*, the partial correlating means 243*d*, and the data demodulating unit 244.

The initial signal estimating means 243*b* estimates initial data based on a part of the transmission command signal that is the modulated signal from the mobile device 10. The initial signal estimating means 243*b* according to this embodiment includes a conversion table storing the initial data and the signal provided by demodulating a part of the transmission command signal by the primary demodulating means 243*a*, the initial data and the signal having previously been correlated to each other. The initial signal estimating means 243*b* according to this embodiment accumulates the transmission command signals from the primary demodulating means 243*a* in a shift register (not shown) as data. Thus, the initial signal estimating means 243*b* estimates the initial data based on the conversion table after a length of the data accumulated in the shift register (not shown) (referred to as accumulated data hereinafter) reaches a required data length or more.

The data length required for estimating the initial data based on a part of the transmission command signal depends on a code type and a code length of a signal used in the communication. For example, in the case where a diffusion signal having an M sequence and a code length of 31 is used, the required data length is 5 bits. Meanwhile, in the case where a diffusion signal having a Gold sequence and a code length of 31 is used, the required data length is 8 bits.

According to this embodiment, the Gold sequence is used as the code type. The Gold sequence is generated through an EXCLUSIVE-OR operation of the two M sequences. Thus, in the conversion table according to this embodiment, the signal provided by demodulating a part of the transmission command signal by the primary demodulating means 243a and the data of the two M sequences are previously related and stored. FIG. 5 shows one example of the conversion table according to this embodiment. According to this embodiment, a RAM is used for maintaining the table in which the signal provided by demodulating a part of the transmission command signal by the primary demodulating means 243a and the address of the conversion table are previously matched to each other.

Figure 6:
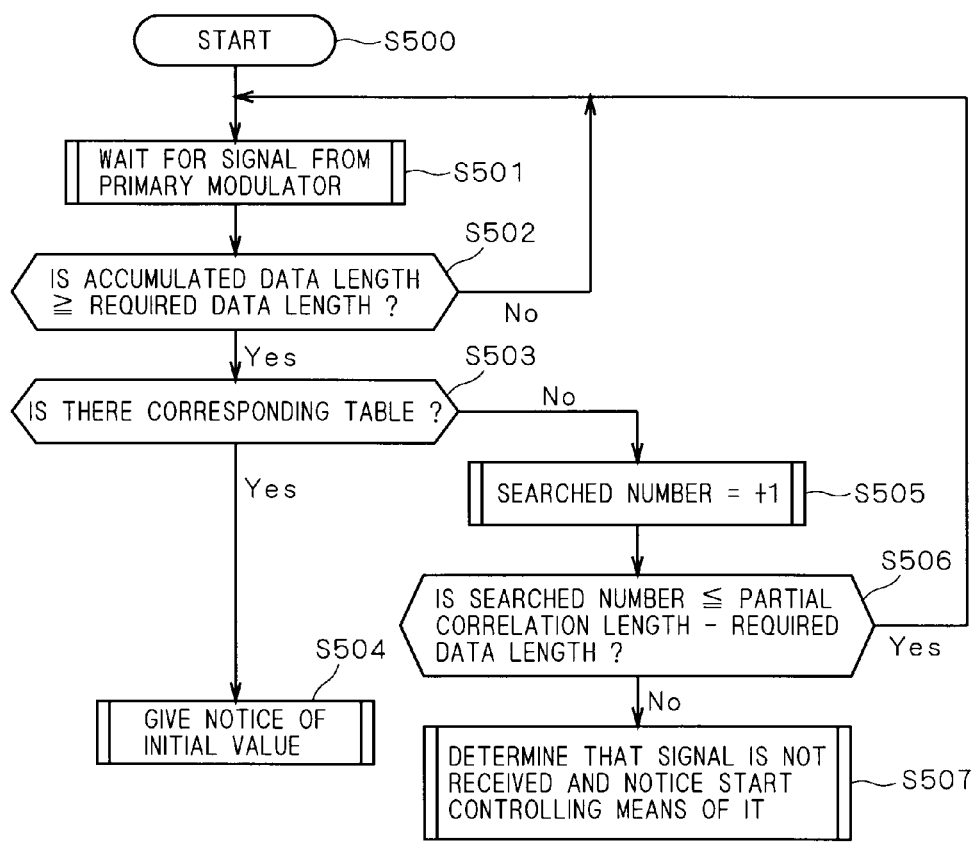
FIG. 6 is a flowchart showing an operation of the on-vehicle device according to the first embodiment.

A description will be made of the operation in which the initial signal estimating means 243b estimates the initial data based on a part of the transmission command signal with reference to a flowchart shown in FIG. 6. First, after start (step S500), the initial signal estimating means 243b waits for the transmission command signal from the primary demodulating means 243a. Here, according to this embodiment, the received transmission command signals are accumulated in the shift register (step S501). Then, the initial signal estimating means 243b confirms whether the data length of the accumulated data reaches the required data length or not (step S502).

When the data length does not reach the required data length or more in step S502, step S501 is repeated until the data length of the accumulated data reaches the required data length. When the data length reaches the required data length or more in step S502, a corresponding conversion table is searched. According to this embodiment, it is determined whether the signal provided by demodulating a part of the transmission command signal from the mobile device 10 by the primary demodulating means 243a coincides with the address of the conversion table or not. That is, it is determined whether the signal provided by demodulating a part of the transmission command signal from the mobile device 10 by the primary demodulating means 243a corresponds to the conversion table or not (step S503).

When the signal demodulated by the primary demodulating means 243a corresponds to the conversion table in step S503, the initial data stored in the conversion table is obtained. Thus, the obtained initial data is given to the PN signal generating means 243c (step S504).

When a part of the transmission command signal does not correspond to the conversion table in step S503, one is added to the searched number (step S505). Thus, it is determined whether the searched number is equal to or less than a value provided by subtracting the required data length from the length of the partial correlation of the partial correlating means 243d (step S506).

When the searched number is equal to or less than the value provided by subtracting the required data length from the partial correlation length of the partial correlating means 243d in step S506, the process is returned to step S501 to wait for the transmission command signal from the primary demodulating means 243a (step S501). According to this embodiment, under the condition that the accumulated previous data is retained in the shift register, the operation waits for the transmission command signal from the primary demodulating means 243a. Thus, when one bit of the transmission command signal is received from the primary demodulating means 243a, the accumulated data is shifted, and the received one bit is accumulated in the shift register and then the estimation is made based on the accumulated data again. Thus, the initial signal estimating means 243b according to this embodiment additionally receives one bit from the primary demodulating means 243a and performs the estimation again when the signal provided by demodulating a part of the transmission command signal from the mobile device 10 by the primary demodulating means 243a does not correspond to the conversion table.

When the searched number is beyond the value provided by subtracting the required data length from the partial correlation length of the partial correlating means 243d in step S506, it is determined that the transmission command signal is not received (unreceived) from the mobile device 10, and the determination is given to the start controlling means 240 (step S507). As will be described below, the start controlling means 240 determines that the transmission command signal is not received in response to the determination, and stops each means except for the start controlling means 240 of the receiving unit 24.

Figure 7:
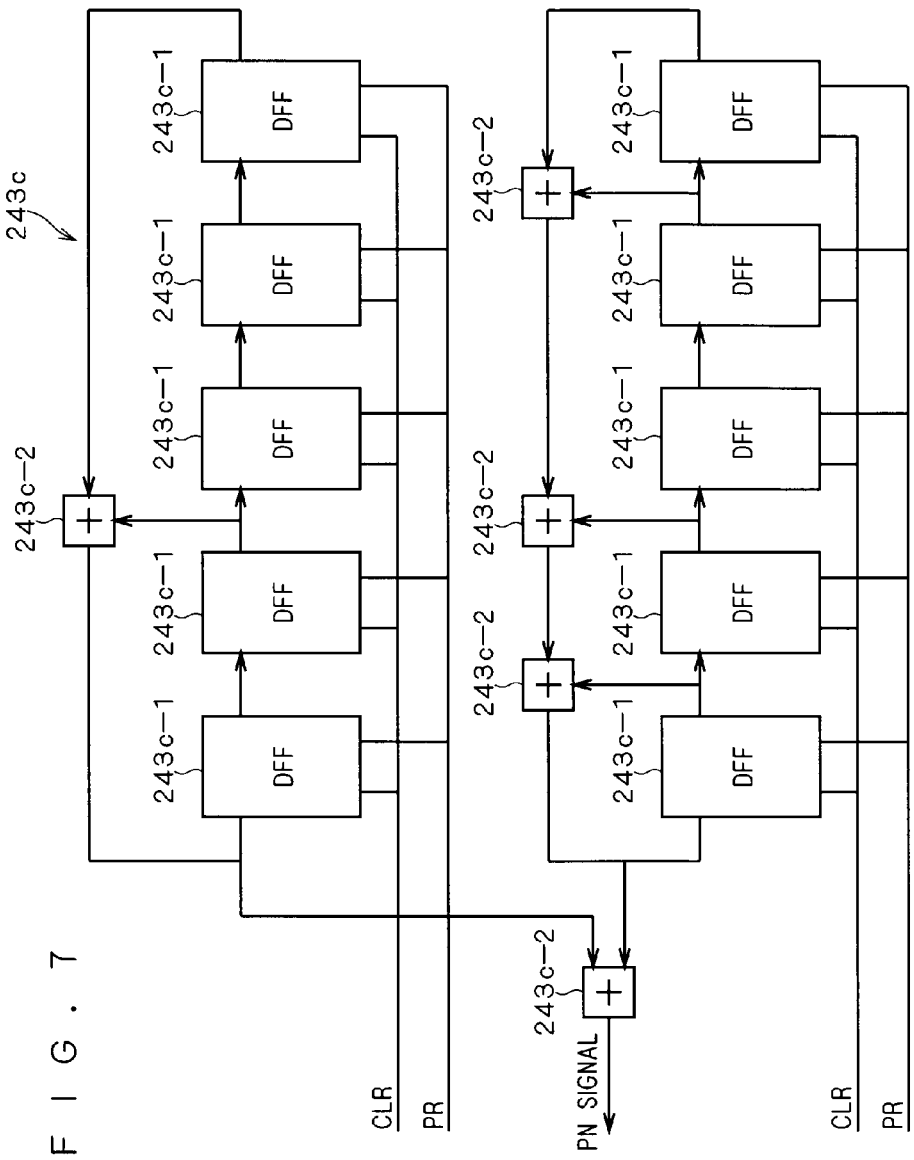
FIG. 7 is a block diagram showing the constitution of the on-vehicle device according to the first embodiment.

FIG. 7 is a block diagram showing one example of a constitution of the PN signal generating means 243c. FIG. 7 shows a constitution in which the Gold-sequence PN signal can be generated from first and second initial data in the conversion table shown in FIG. 5. As shown in FIG. 7, the PN signal generating means 243c serving as reference signal generating means according to this embodiment includes a DFF (D flip flop) 243c-1 and an EXCLUSIVE OR processing means 243c-2 for outputting the ECLUSIVE OR of the input signal.

The PN signal generating means 243c serving as the reference signal generating means generates the PN signal serving as a reference signal, based on the initial data estimated by the initial signal estimating means 243b. According to this embodiment, the initial data estimated by the initial signal estimating means 243b is given from the initial signal estimating means 243b to the PN signal generating means 243c as a CLR signal and a PR signal. The PN signal generating means 243c initializes the DFF 243c-1 using the CLR signal and the PR signal. Thus, the EXCLUSIVE OR operation is performed by the EXCLUSIVE OR processing means 243c-2 to generate a Gold-sequence PN signal and supplies the generated PN signal to the partial correlating means 243d.

The partial correlating means 243d calculates a correlation value between the transmission command signal from the mobile device 10 and the PN signal generated by the PN signal generating means 243c. Thus, the partial correlating means 243d determines whether the transmission command signal is received or not based on the calculated correlation value and informs the start control means 240 of the determination result.

In this case, the above on-vehicle device is compared with a conventional on-vehicle device. According to the conventional on-vehicle device, a PN signal is generated separately from a transmission command signal transmitted from a mobile device 10 in an internal circuit, and a correlation value between the PN signal and the transmission command signal is calculated. Therefore, in the conventional on-vehicle device, it takes long time to synthesize them when the correlation value is calculated. Although it is proposed that a plurality of partial correlating means are provided in the on-vehicle device in order to shorten the synchronizing time, the problem is that power consumption is increased because the plurality of partial correlating means are provided.

Meanwhile, according to the partial correlating means 243d of the on-vehicle device 20 according to this embodiment, the PN signal is generated based on the transmission command signal from the mobile device 10, and the correlation value between the PN signal and the transmission command signal is calculated. Since timing synchronization can be implemented between the PN signal generated based on the transmission command signal and the transmission command signal, the synchronizing time can be shortened. Therefore, the partial correlation can be obtained for a short time without providing the plurality of partial correlating means 243d consuming great power. As a result, the time required for determining whether the transmission command signal is received or not can be shortened without increasing the power consumption.

When the start controlling means 240 receives the notice that the transmission command signal is not received, from the partial correlating means 243d, it stops each means except for the start controlling means 240 of the receiving unit 24. Thus, when the transmission command signal is not received, the data is not outputted from the receiving unit 24 to the ECU 21. Therefore, the ECU 21 can detect whether the transmission command signal is received from the mobile device 10 or not based on whether the data is outputted from the receiving unit 24 or not. In addition, the ECU 21 may manage a time from when the start signal is given to the receiving unit 24 till when the data is outputted from the receiving unit 24 by a timer. Thus, when the time exceeds a predetermined time, the start controlling means 240 of the receiving unit 24 stops each means except for the start controlling means 240 of the receiving unit 24, and the determination that the transmission command signal is not received may be noticed.

When the start controlling means 240 receives the notice that the transmission command signal is received, from the partial correlating means 243d, it starts the data demodulating unit 244. According to this embodiment, the data demodulating unit 244 demodulates the transmission command signal from the mobile device 10, the starting of the data demodulating unit 244 being controlled based on the correlation value calculated by the partial correlating means 243d. The data demodulating unit 244 includes correlating means 244a and data demodulating means 244b in this embodiment.

The correlating means 244a calculates a correlation value between the transmission command signal from the mobile device 10 and the PN signal generated by the PN signal generating means 243. According to this embodiment, the correlation with the whole PN-sequence code length is obtained. The data demodulating means 244b determines data "0" or data "1" based on the correlation value calculated by the correlating means 244a. Thus, the data demodulating unit 244 according to this embodiment demodulates the transmission command signal from the mobile device 10 and supplies the demodulated data to the ECU 21.

Figure 8:
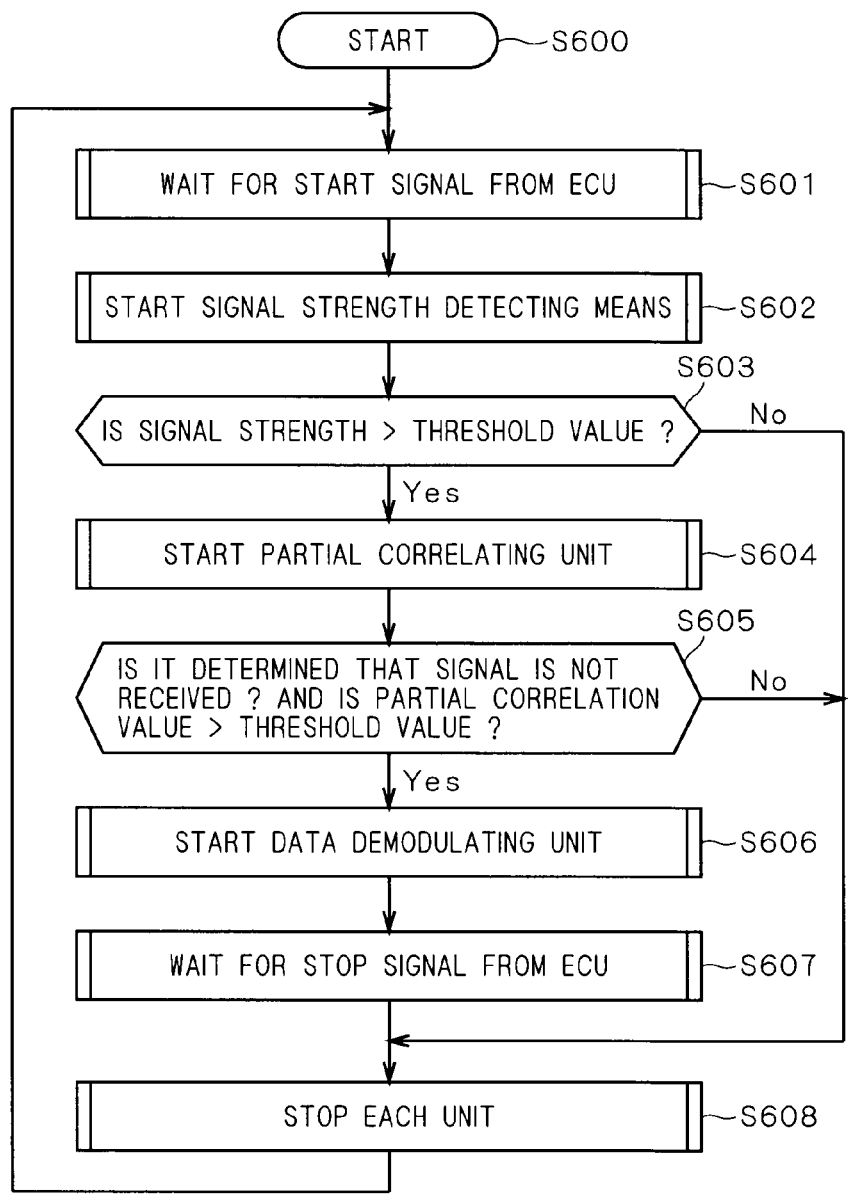
FIG. 8 is a flowchart showing an operation of the on-vehicle device according to the first embodiment.

FIG. 8 is a flowchart showing the operations of the start controlling means 240 and its vicinity. First, after start (step S600), the start controlling means 240 waits for the start signal from the ECU 21 (step S601). Thus, when the start controlling means 240 receives the start signal from the ECU 21, it starts the signal strength detecting means 241 (step S602). Then, the signal strength detecting means 241 determines whether the signal strength of the transmission command signal from the mobile device 10 exceeds the predetermined threshold value or not (step S603).

When it is not determined that the signal strength exceeds the predetermined threshold value in step S603, the start controlling means 240 stops each means except for the start controlling means 240 of the receiving unit 24 (step S608). When it is determined that the signal strength exceeds the predetermined threshold value in step S603, the start controlling means 240 starts the partial correlating unit 243 (step S604). Then, it is determined whether or not the initial signal estimating means 243d determines that the signal is not received, and at the same time, it is determined whether or not the correlation value provided by the partial correlating means 243d exceeds a predetermined threshold value (step S605).

When it is determined that the signal is not received by the initial signal estimating means 243b in step S605, or when the correlation value by the partial correlating means 243d is equal to or less than the predetermined threshold value, the start controlling means 240 stops each means except for the start controlling means 240 of the receiving unit 24 (step S608).

When it is not determined that the signal is not received by the initial signal estimating means 243b and when the correlation value by the partial correlating means 243d exceeds the predetermined threshold value, the start controlling means 240 starts the data demodulating unit 244 (step S606). Thus, the data demodulating unit 244 demodulates the transmission command signal from the mobile device 10 and supplies the demodulated data to the ECU 21. Meanwhile, the start controlling means 240 waits for a stop signal from the ECU 21 (step S607) and when it receives the stop signal from the ECU 21, it stops each means except for the start controlling means 240 of the receiving unit 24 (step S608). After step S608, the process is returned to step S601 and waits for the start signal from the ECU 21.

Since the on-vehicle device 20 having the above constitution generates the PN signal for determining whether the transmission command signal is received or not, based on the transmission command signal, the synchronizing time to calculate the correlation value between the transmission command signal and the PN signal can be shortened. Thus, since the time for synchronizing the transmission command signal and the PN signal can be shortened without providing the plurality of partial correlating means 243d performing the clock operation requiring a measurable amount of power, the power consumption can be reduced.

In addition, according to this embodiment, the initial signal estimating means 243b estimates the initial data with the conversion table in which the signal provided by demodulating a part of the transmission command signal by the primary demodulating means 243a and the initial data are previously related and stored. Therefore, even when the circuit performing the clock operation requiring the measurable amount of power is not provided, since the initial data can be estimated, the power consumption can be reduced.

In addition, according to this embodiment, when the signal provided by demodulating a part of the transmission command signal from the mobile device 10 by the primary demodulating means 243a does not correspond to the conversion table, the initial signal estimating means 243b additionally receives one bit from the primary demodulating means 243a, and estimates the initial data again. Thus, the initial data can be estimated as much as possible without immediately determining that the signal is not received.

In addition, according to the on-vehicle device 20 in this embodiment, since the PN signal used for demodulating the transmission command signal in the data demodulating unit 244 is generated based on the transmission command signal, the synchronizing time between the transmission command signal and the PN signal can be shortened. Thus, a time required for demodulating the transmission command signal in the data demodulating unit 244 can be shortened.

In addition, according to this embodiment, the initial signal estimating means 243b includes the conversion table in which the signal provided by demodulating a part of the transmission command signal by the primary demodulating means 243a and the initial data are previously related and stored. However, the present invention is not limited to this, and when the transmission command signal is processed by spread spectrum with the M sequence, the initial signal estimating means 243b may use the signal provided by demodulating a part of the transmission command signal from the mobile device 10 by the primary demodulating means 243a as the initial data as it is. According to this constitution, the PN signal generating means 243c can generate the PN signal based on the transmission command signal. Thus, the circuit size of the on-vehicle device 20 can be small and the power consumption can be reduced.

In addition, the correlating means 244a used for demodulating the transmission command signal may be the partial correlating means 243d used for determining whether the transmission command signal is received or not, and may use the same circuit as that of the partial correlating means 243d. Thus, when the correlating means 244a is the partial correlating means 243d, since the number of the circuit performing the clock operation can be reduced, the power consumption can be reduced.

In addition, the partial correlating means 243d determining the presence or absence of the signal may correlate with a code length considerably shorter than a whole code length, and the correlating means 244a may include partial correlating means having a code length considerably longer than that of the partial correlating means 243d.

<Second Embodiment>

According to the first embodiment, when the signal provided by demodulating a part of the transmission command signal from the mobile device 10 by the primary demodulating means 243a does not correspond to the conversion table, the initial signal estimating means 243b additionally receives one bit from the primary demodulating means 243a and estimates the initial data again. Meanwhile, according to this embodiment, when a signal provided by demodulating a part of a transmission command signal from a mobile device 10 by the primary demodulating means 243a does not correspond to a conversion table, initial signal estimating means 243b uses initial data corresponding to a transmission command signal existing in a conversion table and having the shortest signal distance from the demodulated signal. The same component as that in the first embodiment in the on-vehicle device according to this embodiment is allotted to the same reference and it will not be described here.

Figure 9:
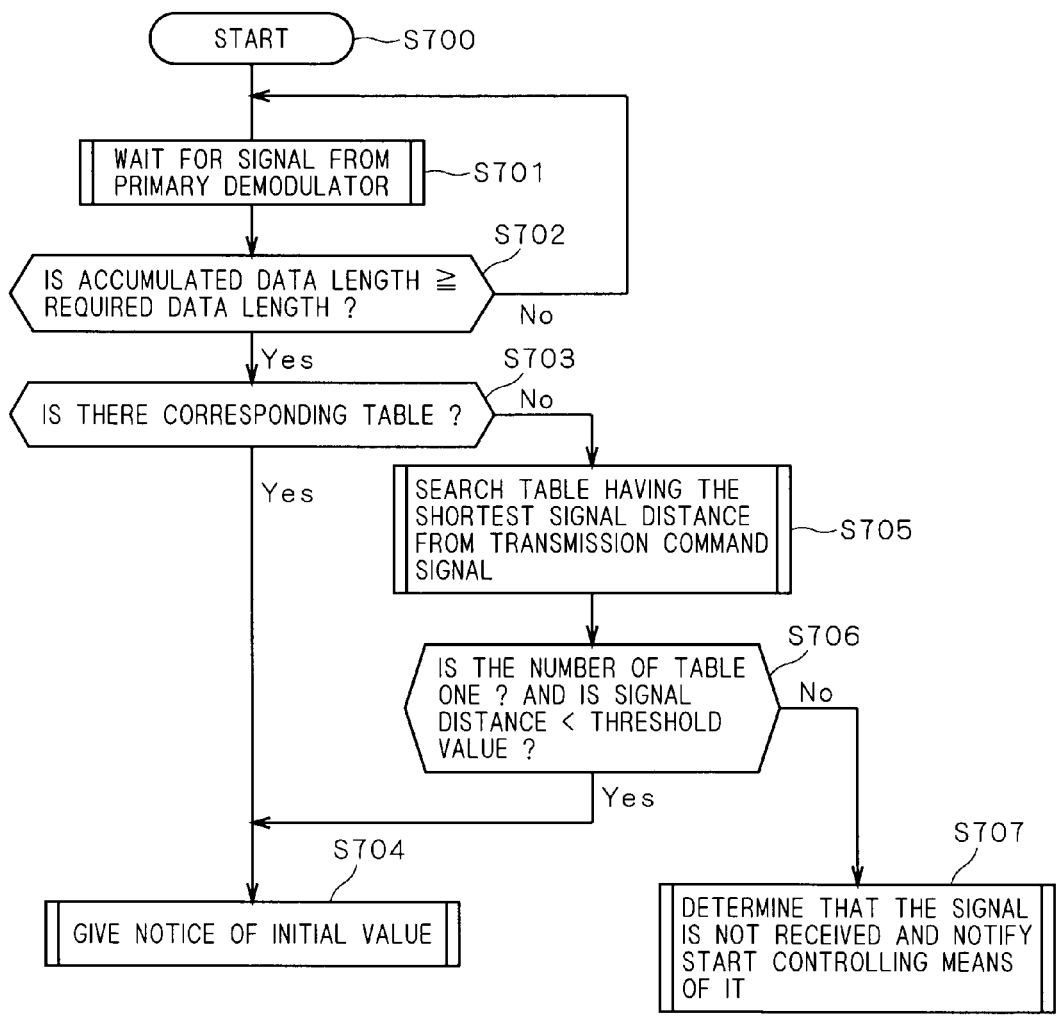
FIG. 9 is a flowchart showing an operation of an on-vehicle device according to a second embodiment.

FIG. 9 is a flowchart to describe the operation of the initial signal estimating means 243b according to this embodiment. First, after start (step S700), the initial signal estimating means 243b waits for the transmission command signal from the primary demodulating means 243a. In this case, according to this embodiment, the received transmission command signal is accumulated in a register (step S701). Then, the initial signal estimating means 243b confirms whether the data length of the accumulated data reaches a required data length or not (step S702).

When the data length does not reach the required data length or more in step S702, the step S701 is repeated until the data length of the accumulated data reaches the required data length. When it reaches the required data length in step S702, a corresponding conversion table is searched. According to this embodiment, it is determined whether the signal provided by demodulating a part of the transmission command signal from the mobile device 10 coincides with an address of the conversion table or not. That is, it is determined whether the signal provided by demodulating a part of the transmission command signal from the mobile device 10 by the primary demodulating means 243a corresponds to the conversion table or not (step S703).

When the demodulated signal corresponds to the conversion table in step S703, initial data stored in the conversion table is obtained and the obtained initial data is given to PN signal generating means 243c (step S704).

When the demodulated signal does not correspond to the conversion table in step S703, the conversion table having the shortest signal distance from the signal provided by demodulating a part of the transmission command signal from the mobile device 10 by the primary demodulating means 243a is searched (step S705). Then, it is determined whether the number of the conversion table having the shortest signal distance from the demodulated signal is one or not and at the same time, it is determined whether the signal distance from the signal is smaller than a predetermined threshold value or not (step S706).

When the number of the conversion table having the shortest signal distance from the signal demodulated by the primary demodulating means 243a is one and the distance from the signal is smaller than the predetermined threshold value in step S706, the initial data corresponding to the transmission command signal existing in the conversion table is given to the PN signal generating means 243c (step S704). When the plurality of conversion tables having the shortest signal distance from the demodulated signal exist or the signal distance from the signal is the predetermined threshold value or more in step S706, it is determined that the transmission command signal is not received from the mobile device 10 (unreceived) and the determination is given to start controlling means 240 (step S707).

According to the on-vehicle device 20 described above, similar to the first embodiment, since the time for synchronizing the transmission command signal with the PN signal can be shortened without increasing the size of the circuit performing the clock operation, the power consumption can be reduced.

In addition, according to this embodiment, the initial signal estimating means 243b determines whether the signal provided by demodulating a part of the transmission command signal from the mobile device 10 by the primary demodulating means 243a corresponds to the conversion table or not. Thus, when it is determined that the demodulated signal does not correspond to the conversion table, the initial data corresponding to the transmission command signal existing in the conversion table and having the shortest signal distance from the demodulated signal is used. Thus, even when a part of the transmission command signal is wrong due to reception failure, the corresponding conversion table can be searched, and feasible initial data can be selected. As a result, it is not determined that the signal is not received immediately and the initial data can be estimated as much as possible.

In addition, according to this embodiment, when the plurality of conversion tables having the shortest signal distance from the signal demodulated by the primary demodulating means 243a exist, it is determined that the signal is not received and the determination is given to the start controlling means 240. However, the present invention is not limited to this, and when the plurality of conversion tables exist, the signal may be received again in step S701 and the search may be performed again.

While the invention has been shown and described in detail, the foregoing description is in all aspects illustrative and not restrictive. It is therefore understood that numerous modifications and variations can be devised without departing from the scope of the invention.

What is claimed is:

1. An on-vehicle communication device communicating with a mobile device through a modulated signal modulated by spread spectrum, comprising:
   an initial signal estimating unit for estimating initial data based on a part of the modulated signal from said mobile device;

a reference signal generating unit that generates a reference signal based on the initial data estimated by said initial signal estimating unit;

a partial correlating unit that calculates a correlation value between the modulated signal from said mobile device and said reference signal; and a data demodulating unit that demodulates the modulated signal from said mobile device, said data demodulating unit starting when the correlation value calculated by said partial correlating unit exceeds a threshold value, wherein said initial estimating unit comprises a table storing said initial data and a signal provided by demodulating a part of said modulated signal by a primary demodulating unit, said initial data and said signal having previously been correlated to each other.

2. The on-vehicle communication device according to claim 1, wherein said modulated signal is processed by spread spectrum with an M sequence, and said initial signal estimating unit uses a signal provided by demodulating a part of the modulated signal from said mobile device by a primary demodulating unit as it is, as said initial data.

3. The on-vehicle communication device according to claim 1, wherein when the signal provided by demodulating a part of the modulated signal from said mobile device by the primary demodulating unit does not corresponds to said table, said initial signal estimating unit additionally receives one bit from said primary demodulating unit and performs said estimation again.

4. The on-vehicle communication device according to claim 1, wherein when the signal provided by demodulating a one part of the modulated signal from said mobile device by the primary demodulating unit does not corresponds to said table, said initial signal estimating unit uses said initial data corresponding to the signal existing in said table and having the shortest signal distance from the modulated signal.

5. The on-vehicle communication device according to claim 1, wherein said data demodulating unit comprises a correlating unit that calculates a correlation value between the modulated signal from said mobile device and said reference signal generated by said reference signal generating unit, and demodulates the modulated signal from said mobile device, based on the correlation value calculated by said correlating unit.

6. The on-vehicle communication device according to claim 5, wherein said correlating unit includes said partial correlating unit.

7. A method performed by an on-vehicle communication device for communicating with a mobile device through a modulated signal modulated by spread spectrum, the method comprising:

estimating, by an initial signal estimating unit, initial data based on a part of the modulated signal from said mobile device;

generating, by a reference signal generating unit, a reference signal based on the estimated initial data;

calculating, by a partial correlating unit, a correlation value between the modulated signal from said mobile device and said reference signal; and demodulating, by a data demodulating unit, the modulated signal from said mobile device, the demodulating starting when the correlation value exceeds a threshold value, wherein said initial estimating unit comprises a table storing said initial data and a signal provided by demodulating a part of said modulated signal by a primary demodulating unit, said initial data and said signal having previously been correlated to each other.

8. The method according to claim 7, wherein said modulated signal is processed by spread spectrum with an M sequence, and said estimating uses a signal provided by demodulating a part of the modulated signal from said mobile device by said primary demodulating unit as it is, as said initial data.

9. The method according to claim 7, wherein when the signal provided by demodulating a part of the modulated signal from said mobile device by said primary demodulating unit does not correspond to said table, said estimating includes additionally receiving one bit from said primary demodulating unit and performing said estimation again.

10. The method according to claim 7, wherein when the signal provided by demodulating a part of the modulated signal from said mobile device by said primary demodulating unit does not correspond to said table, said estimating uses said initial data corresponding to the signal existing in said table and having the shortest signal distance from the modulated signal.

11. The method according to claim 7, further comprising:

calculating, by a correlating unit, a correlation value between the modulated signal from said mobile device and said reference signal; and demodulating, by said data demodulating unit, the modulated signal from said mobile device, based on the calculated correlation value calculated by said correlating unit.

* * * * *